United States Patent [19]
Babin

[11] 4,144,802
[45] Mar. 20, 1979

[54] HURRICANE/TORNADO BUILDING PROTECTION SYSTEM

[76] Inventor: Paul A. Babin, Rm. 760, Delta Towers, 1732 Canal St., New Orleans, La. 70112

[21] Appl. No.: 760,513

[22] Filed: Jan. 19, 1977

[51] Int. Cl.$^2$ ............................................. F23L 17/00
[52] U.S. Cl. ........................................... 98/119; 52/1; 98/43 C; 160/5
[58] Field of Search .................... 52/1; 160/1, 2, 5; 98/119, 42 R, 42 A, 43, 43 R, 66 R, 121 A

[56] References Cited
U.S. PATENT DOCUMENTS

| | | | |
|---|---|---|---|
| 1,725,971 | 8/1929 | Zacharias | 98/42 |
| 3,066,423 | 12/1962 | Solem | 98/119 |
| 3,523,500 | 8/1970 | Artis et al. | 98/66 R |
| 3,791,280 | 2/1974 | Williamson | 98/121 A |

*Primary Examiner*—Ronald C. Capossela

*Attorney, Agent, or Firm*—C. Emmett Pugh & Associates

[57] ABSTRACT

A system for the protection of a building, house, or like structure, is provided which affords protection against the forces of wind, pressure differentials, water and sound. The device features a ventilation system which allows normal ventilation of the structure, but provides an increased area through which air can travel in the event of a tornado or like storm which produces a rapid and large change in atmospheric pressure. There is additionally provided a wind deflecting side portion which remains in a normally open position, which open position absorbs and deflects the force of high velocity winds as is generated by hurricanes and the like. Water protection is provided by drains and deflecting anti-splash plates that prevent the entry of excessive amounts of water into the inner portion of the structure. Within the structure, louvers through inner walls equalize pressure between different rooms, lessening the chance for pressure differential change.

11 Claims, 3 Drawing Figures

HURRICANE/TORNADO BUILDING PROTECTION SYSTEM

BACKGROUND OF THE INVENTION

1. Field of the Invention

The present invention relates to storm protection systems for buildings. More particularly, the present invention relates to a combined hurricane and tornado protection system which system automatically adapts to protect against different destructive forces of pressure differential (as associated with tornados) and high wind and rain (as associated with hurricanes).

2. General Background and Prior Art

Destruction caused by wind storms, such as hurricanes, tornadoes, cyclones and the like, can be due to either the destructive force of the high winds, as with hurricanes, or the created tremendous pressure differential which accompanies storms such as tornados. The air inside of buildings, houses and the like, is normally at a pressure of approximately thirty inches of mercury, although this figure may vary two inches of mercury in either direction (i.e. twenty eight inches to thirty two inches of mercury). This normally is trapped inside of a building and creates a pressure differential when a much lower pressure storm arises in the area adjacent the structure. The unbalanced pressure differential creates an outwardly acting pressure in the building which can cause the buildings to literally explode. The magnitude of the pressure differential is on the order of two to five pounds per square inch. Although many larger and newly constructed buildings meet building codes and can often withstand such pressure differentials, lightly constructed buildings and older structures are the structures which are more likely to explode and be destroyed. Additionally, such structures are highly susceptible to collapse or damage from wind force as generated by hurricanes and like high velocity wind storms.

Several systems and devices have been patented which have attempted to provide protection against hurricanes, tornados, and like destructive storms. The following table lists some prior art devices and systems which have obtained U.S. patents.

| PRIOR ART PATENTS | | |
|---|---|---|
| U.S. Pat. No. | Inventor | Issue Date |
| 2,093,515 | A. J. Filkins | Sept. 21, 1937 |
| 2,105,735 | J. P. Hodge | Jan. 18, 1938 |
| 2,297,892 | F. H. Jacobs | Oct. 6, 1942 |
| 2,466,835 | C. A. Bahruth | Apr. 12, 1949 |
| 2,798,422 | V. Bourque | July 9, 1957 |
| 2,774,116 | P. B. Wolverton | Dec. 18, 1956 |
| 2,818,009 | V. B. Steffen | Dec. 31, 1957 |
| 2,820,475 | R. C. Hobbx | Jan. 21, 1958 |
| 2,842,073 | S. K. Huston et al | July 8, 1958 |
| 2,861,447 | N. L. Lieberman | Nov. 25, 1958 |
| 2,925,770 | P. H. Sherron | Feb. 23, 1960 |
| 3,137,099 | M. Wasserman | June 16, 1964 |
| 3,123,867 | E. L. Combs | March 10, 1964 |
| 3,220,079 | R. E. Aggson | Nov. 30, 1965 |
| 3,323,438 | W. G. Korff | June 6, 1967 |
| 3,453,777 | T. J. Reilly | July 8, 1969 |
| 3,481,632 | C. R. Suess | Dec. 2, 1969 |
| 3,520,245 | P. Painter | July 14, 1970 |
| 3,521,546 | L. Day | July 21, 1970 |
| 3,619,961 | R. W. Sterrett et al | Nov. 16, 1971 |
| 3,864,881 | C. P. Wolf | Feb. 11, 1975 |
| 3,861,080 | E. Schibli, et al | Jan. 21, 1975 |
| 3,939,863 | J. C. Robison | Feb. 24, 1976 |
| 3,949,657 | G. L. Sells | Apr. 13, 1976 |

U.S. Pat. No. 2,093,515 issued to Filkins and entitled "Wall Scupper" discloses a valve through a wall of the building. The valve is installed flush with the lower edge of the floor so as to provide an exit for water or other fluid which may have accumulated on the floor and thereafter cause damage to the interior of the building.

The Robison patent, U.S. Pat. No. 3,939,863, entitled "Basement Sump Construction," discloses a sump with a gate valve opening to the exterior portion of a building. One of the objects of this invention is to prevent the back-up flow of water into the building in case of flooding.

The Lieberman Pat. No. 2,851,447, discloses an air inlet passage for ventilation purposes only.

Other patents known to applicant teach the use of vents in various ways. The Sells patent (U.S. Pat. No. 3,949,657) entitled "Ventilated Cap for a Ridge of a Roof" provides a method of attaching a vent to the ridge portion of a roof so as to provide a water tight vent at the highest point of the roof. U.S. Pat. No. 3,220,079 issued to Aggson and entitled "Foundation Vent" provides a through-the-wall vent for foundations, but is without any type of closing mechanism or valve. The U.S. Pat. No. 2,925,770 patent of Sherron entitled "Telephone Booth Lighting and Ventilation Means" provides an air flow ventilation means only, and no valve or like operating structure.

The U.S. Pat. No. 3,520,245 patent issued to Painter discloses a relief and intake air vent for roofs.

The U.S. Pat. No. 3,521,546 patent issued to L. Day on July 21, 1970 and the U.S. Pat. No. 3,864,881 patent issued to C. Wolf on Feb. 11, 1976 both attempt to solve the problem of pressure differentials created by tornadoes, hurricanes and like severe storms.

GENERAL DISCUSSION OF THE PRESENT INVENTION

The present invention provides a unique ventilation and storm protection system which provides protection against both the high wind velocity forces of hurricanes and like storms, and additionally protects against tremendous pressure differentials as is associated with tornados. The system automatically shifts to protect the structure, the shifting operation effected by the different types of destructive forces associated with each type of storm.

Thus, when a tremendous pressure differential occurs, the system provides an increased volume of ventilation to relieve pressure differential. In the event of a high wind velocity storm such a hurricane, deflection means is provided to prevent collapse of the structure under the brute force of the high winds.

The device provides a ventilation system which is in a normally substantially closed position, having minimal openings which allow normal escape of hot air, excess pressure and the like but prevent the entry of rain and wind blown water. In the event of a tornado, increased pressure differential causes the opening of valving structures which provides an increased area through which air can exit the building. In the event of hurricanes, high winds, and heavy rains, appropriate deflection plates and anti-splash plates prevent the building from absorbing the full force of high winds, while at the same time having means for the prevention of water into the inner portion of the building.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein.

DETAILED DESCRIPTION OF THE PREFERRED EMBODIMENT

—Structure"

Figure 1:
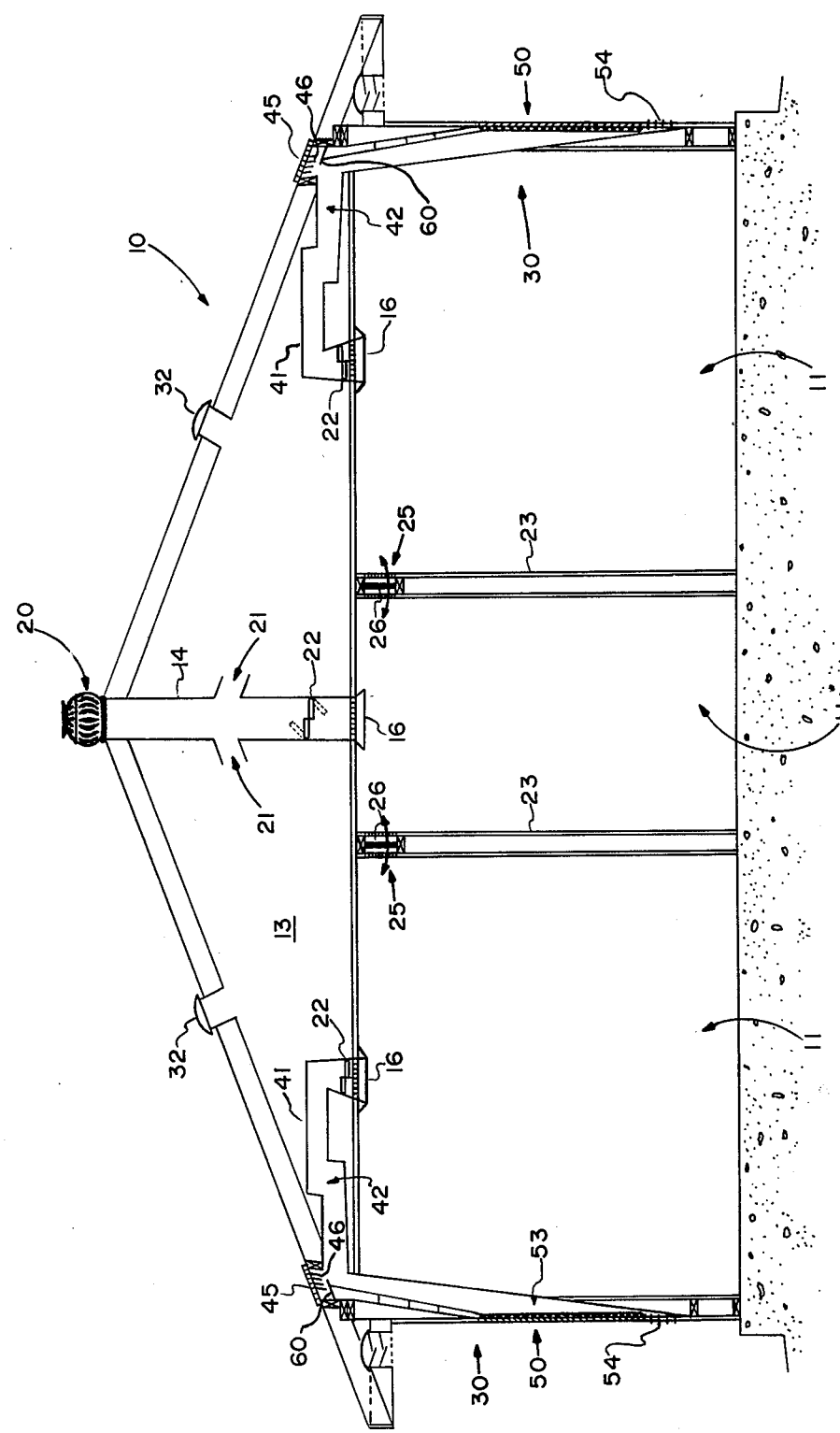
FIG. 1 is an overall sectional schematic view of the preferred embodiment of the apparatus of the present invention installed in a conventional home.

FIG. 1 illustrates a typical home designated by the numeral 10 in which the preferred embodiment of the apparatus of the present invention is installed. The home 10 is provided with a roof turbine vent 20, spring loaded baffle valves 22 and high wind deflectors 30. Ventilation is provided through interior walls 23 by louvers 25, each louver 25 supplied with an interior free swinging baffle 26. Conventional roof ventilators 32 can be provided to supply minimal venting of the roof portion of the home 10 if desired.

Figure 2:
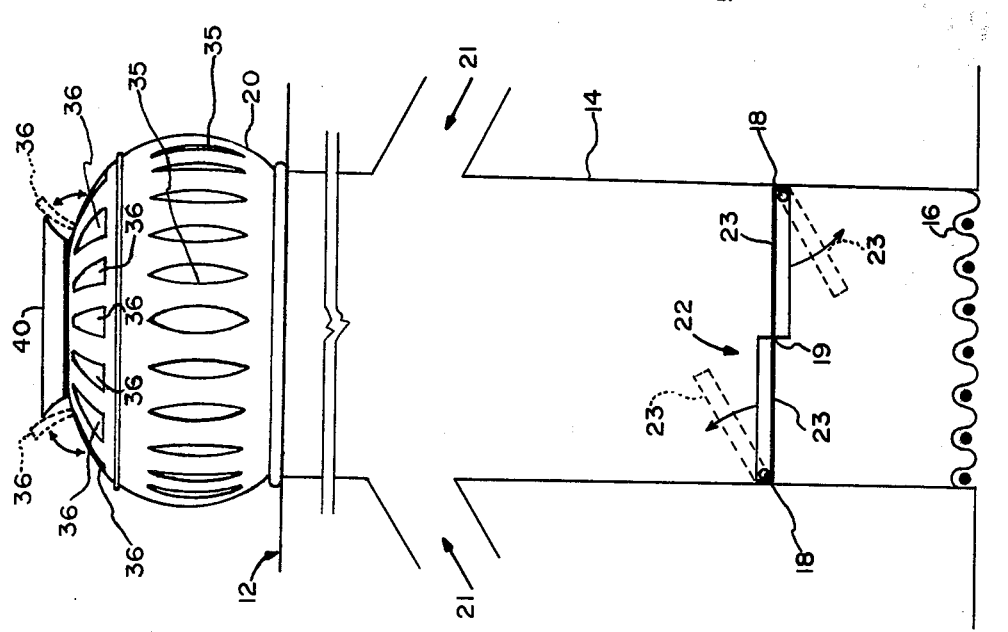
FIG. 2 is a sectional view of the roof ventilator portion of the preferred embodiment of the apparatus of the present invention.

FIG. 2 illustrates more comprehensively the roof turbine vent 20 of the preferred embodiment of the apparatus of the present invention. Turbine 20 can be, for example, cylindrical and can be mounted flush with the roof ridge 12 as can best be seen in FIG. 2. Turbine 20 is mounted on an elongated vent pipe 14 which connects turbine 20 with the inner portion of home 10 at ceiling screen 16. Ceiling screen 16 is any conventional type screen which can be asthetically placed in the ceiling portion of a conventional home. The ceiling screen is in normally an open position, however the flow of air from the interior portion of home 10 cannot normally be accomplished because spring loaded baffle valve 22 would normally be in a closed position. Spring loaded baffle valve 22 is comprised of a pair of pivotally attached flapping plates 23 which are attached at pivots 18 to the sidewall portion of duct 14. In a closed position under the urging of conventional springs, valve plates 23 would abutt and sealably contact valve seating plate 19 which is perforated or screen like to allow the passage of air therethrough when valve plates 23 are in an open position.

The portion of roof turbine 29 above roof ridge 12 is provided with a peripheral row of vents 35 which normally vent only minor amounts of hot air from the attic portion of the home 10 as is known in the art. The upper surface of turbine 20 is provided with a plurality of radially disposed flapper vents 36 which are normally in a closed position. Each flapper vent is pivotally attached at the central portion of turbine 20 and the weight alone of the flapper 36 holds it in a closed position. Flappers 36 would lift under the force of a pressure differential allowing excess pressure within home 20 to exit. Stop crown 40 is provided at the end portion of the upper surface of turbine 20 and provides a stop for flapper vents 36 when they are in an open position. Thus, flapper vents 36 could not be blown past a distance which would normally be sufficient to allow a generous amount of pressure to escape home 10. Stop 40 prevents flapper vents 36 from being blown by outside winds to a totally open position, whereby the weight of each vent 36 would not allow the vent to close under the effect of gravity after pressure had equalized. Thus, when the pressure in home 10 equalized with the exterior pressure, flapper vents 36 would fall under their own weight and seal off the opening thereunder (not shown) and prevent the entrance of rain water into the interior portion of turbine 20.

The flow of air between separate rooms 11 of home 10 is accomplished by louvers 25. Louvers 25 are equipped with inner free swing baffles 26 which swing to open and allow air to flow freely between rooms 11 when pressure differentials occur. With normal pressure, free swinging baffles 26 suspend downwardly and seal separate rooms acoustically and otherwise prevent the flow of air between rooms and maintain temperature conditions within adjacent rooms.

The side portions of home 10 away from turbine 20 are relieved of excess pressure through exterior goose neck outlets 42. Each goose neck outlet is connected to the inner rooms 11 of home 10 at ceiling screens 16. The inner portion of goose neck outlets are provided with spring loaded baffle valves 22 which are in a normally closed position, thus preventing the escape of desirable air, such as artificially heated air from escaping. As described more fully above, each spring loaded baffle valve is urged against valve seat plate 19 and remains in a closed position absent pressure changes which urge the valve plates 23 to open and thereby allow air to exit from rooms 11 to the atmosphere. Gooseneck outlets 42 prevent the entry of rain water by having an increased elevational elbow section 41 which allows air but not fluid to flow therethrough.

The exit of excessive air pressure through gooseneck outlets 42 is completed when the air discharges from the home 10 through exterior roof grates 45. Grates 45 can be provided with anti-splash plates 46 which prevent windblown water from entering gooseneck outlets 42 in excessive amounts. Anti-splash plates thus combine with the elbow sections 41 of outlets 42 to prevent the entry of water or rain into home 10 through outlets 42.

Figure 3:
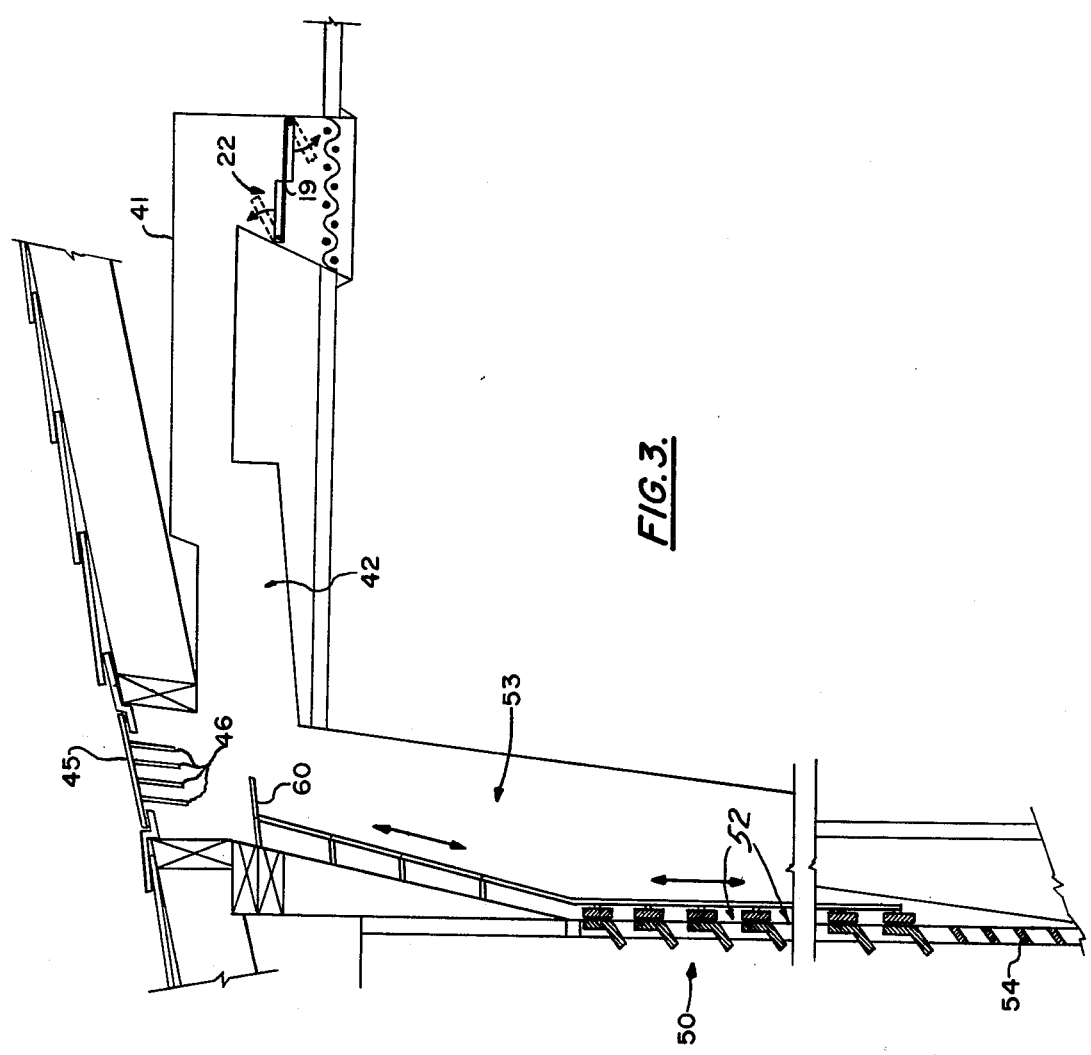
FIG. 3 is a sectional view of the wind deflector and lifting wing portion of the preferred embodiment of the present invention.

The home 10 is protected against high velocity winds by wind deflectors 50. As can best be seen by FIG. 3, wind deflectors 50 remain in a normally open position which provide louvers 52 through which wind can pass. Wind in excessive amounts passes through louvers 50 and is channeled up through deflector ducts 53 and out through grates 45. The angle of inclination of deflector ducts 53 can be varied as required for different velocity winds as dictated by building codes for a given area. The lower portion of wind deflector 50 is normally always open and provides a drain 54 through which rain water can exit.

Louvers 52 are closed when a tornado rather than a hurricane attacks home 10. In such a case, a lifting wind 60 is provided and pivotally connects to the end portions of louvers 52. Lifting wing 60 is urged upwardly (See arrow, FIG. 3) and shuts louvers 52 when lifting wing 60 is urged upwardly by the escape of excess amounts of air from home 10 in the event of a tornado and a tremendous difference in pressure. Thus, if a tornado produces a pressure differential, lifting wind 60 will close louvers 52 thereby allowing the exit of air only from the inner portion of home 10 out through gooseneck 42 and grate 45. No air will proceed through wind deflectors 50 and then through grates 45. Additionally, if high winds are occuring in combination with pressure drop, it is desirable to close wind deflectors 50 so that wind is not routed through deflector 50 into gooseneck 42 and then into the interior portion of home 10 causing an increase in pressure and a trapping of interior air rather than the desired exit of interior air through gooseneck 41 and out grate 45.

—Operation"

Absent a storm, such as a tornado or hurricane, in the area of home 10, the preferred embodiment of the apparatus of the present invention provides a system which completely seals home 10 from the leak of interior air while allowing exhaust of hot air from the attic 13 into the atmosphere. In normal operation, hot air in attic 13 would leave through conventional ventilators 32 and through roof turbine 20 by means of side vents 21. In such a situation, spring loaded baffle valve 22 would be closed preventing the exit of cooler or other desirable air from rooms 11 through ceiling screen 16.

In a like manner, the spring loaded baffle valves 22 provided in gooseneck outlets 42 would be in a closed position preventing the exit of air within rooms 11 through ceiling screens 16 to the atmosphere through grates 45.

Additionally, the flow of air between rooms 11 would be prevented since the free swinging baffles 26 of louvers 25 would be hanging straight, thus effecting a closure of the air passages. Such free swinging baffles would be insulated to provide additionally a sound barrier between rooms 11.

In the event that a tornado or like storm which causes a decrease in atmospheric pressure would arise, spring loaded baffle valves 22 would open to allow the exit of excessive amounts of pressure to the atmosphere. At turbine 20, valve 22 would open allowing air to proceed upwardly through duct 14 and pass out through the upper portion of turbine 20 forcing flapper vents 36 to open. When pressure had equalized within home 10, flapper vents 36 would fall under their own weight, sealing the upper portion of vent 20 and preventing the entry of rain water and the like into duct 14. The opening of valve 22 within gooseneck outlets 42 would allow air to escape through outlet 42 and grate 45. Air flowing rapidly through outlet 42 would lift lifting wing 60, closing louvers 52 of wind deflector 50. Thus only air from inner rooms 11 would be venting through grate 45.

Alternatively, if a hurricane with high velocity winds were to strike home 10, baffle valves 22 and flapper vents 36 would remain in a closed position. Wind deflectors 50 would remain open allowing the entrance of high speed wind into deflector duct 53 which would then be deflected upwardly and out through grate 45. The angular orientation of deflector duct 53 provides a force absorbing and rerouting surface which prevents the destruction of home 10 by brute force against its outer walls and by preventing the uplifting effect which hurricane force winds would have upon the roof portion of home 10, as the winds normally would exert a lifting effect on the eaves thereof.

Because many varying and different embodiments may be taught within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed as invention is:

1. A pressure relief roof vent system for a building having an attic which is at least generally shut off from and located above the usable interior of the building, comprising:

a. an air conveying duct mountable through the roof portion of the building and extending from the lower usable interior of the building through the attic and to the exterior of the building and through the roof of the building, said air duct provided with openings at its respective end portions, allowing air to flow through said air duct from a lower end portion communicating with the usable interior of the building to the other, upper end portion thereof communicating with the exterior, the lower opening attachable to an opening in the interior portion of the building, the other end portion of said air duct providing an outlet through said roof;
   b. normally open side duct means located in the attic of the building on said air duct and in air flow communication therewith between the end portions of said air duct for allowing hot air in the attic to enter said air duct through said side duct means and exit to the exterior; and
   c. normally closed valve means in said air duct below said side duct means for releasing air to flow through said air duct from the useable interior, said valve means being automatically actuated to an open position by a large pressure differential existing on the opposite sides of said valve means within said air duct between the interior and the exterior of the building such as occur in hurricanes and tornadoes.

2. The apparatus of claim 1 wherein said valve means is comprised of:

a. a flat, pivotally mounted flap within said air duct; and
   b. urging means on said flap for holding said flap in a closed position within said air duct, allowing no flow of air through the lower portion of said air duct below said side duct means.

3. The apparatus of claim 1 wherein said valve means is further comprised of a valve seat, said flap registering in a closed position against said seat when said flap is in a closed position.

4. The apparatus of claim 1 wherein there is further provided turbine means on the end portion of said air duct mounted through the roof portion of said building.

5. The apparatus of claim 4 wherein said turbine is rotatably mounted on said duct and said air turbine is provided with a plurality of air conveying vent openings therethrough.

6. The apparatus of claim 5 wherein at least one of said vent openings is provided with a cooperating cover, said cover being pivotally attached to said turbine, said cover being normally urged to register into a closed position over said vent opening, said cover being forced to open, allowing air to flow through said vent opening, by a pressure differential existing between said duct and the outer surface of the interior of said air turbine.

7. A storm protection apparatus for a building, comprising:

a. valving louver means mountable in the wall portion of a building, said louver means operable to a first closed substantially air tight position, and to a second open position allowing gusts of air to pass therethrough;
   b. inclined duct means associated with said louver means for deflecting said gusts of air which pass through said open louver means vertically away from the building;

c. lifting wing means cooperatively connected to said louver means for operating said louver means, said louver means normally urging said louver means into an open position, said louver means urged to a closed position by a drop in air pressure within said inclined duct; and d. venting duct means connecting said inclined duct means and the interior portion of the building for venting pressure within the building to said inclined duct means, said venting duct means providing a lower elevational section at the connection formed with said inclined duct means, and an upper elevational portion between the connection formed with said inclined duct means and the connection formed with the building interior portion.

8. The apparatus of claim 7, further comprising valve means in said venting duct means for controlling the flow of air through said venting duct means.

9. The apparatus of claim 8, wherein said valve means assumes a closed, substantially air tight position when the atmospheric pressure is substantially equal within and without the building, and said valve means opens to allow the venting of pressure through said venting duct means when the atmospheric pressure is lower without the building than within.

10. The apparatus of claim 7, further comprising swing baffle means mountable within the interior wall portions of the building and for equalizing the atmospheric pressure within the building.

11. The apparatus of claim 8 wherein said valve means is comprised of:

a. a valve seat mountable within said venting duct means;

b. a valving flap pivotally attached to said venting duct means, and registerable with said valve seat to form a substantially air tight seat therewith; and c. urging means for retaining said flap in a closed position against said seat when the atmospheric pressure within and without the building are substantially equal.

* * * * *